(12) United States Patent
Pawelski et al.

(10) Patent No.: US 8,928,269 B2
(45) Date of Patent: Jan. 6, 2015

(54) POWER SYSTEM HAVING SHORT CIRCUIT PROTECTION CONTROLLER

(71) Applicant: Caterpillar Inc., Peoria, IL (US)

(72) Inventors: Paul Curtis Pawelski, Griffin, GA (US); Ryan Christopher Byrd, Griffin, GA (US)

(73) Assignee: Caterpillar Inc., Peoria, IL (US)

( * ) Notice: Subject to any disclaimer, the term of this patent is extended or adjusted under 35 U.S.C. 154(b) by 151 days.

(21) Appl. No.: 13/722,075

(22) Filed: Dec. 20, 2012

(65) Prior Publication Data

US 2014/0177108 A1    Jun. 26, 2014

(51) Int. Cl.
*H02P 3/22* (2006.01)
*H02H 7/06* (2006.01)

(52) U.S. Cl.
CPC .................................... *H02H 7/06* (2013.01)
USPC .............. 318/515; 318/516; 318/34; 318/558

(58) Field of Classification Search
CPC ....................................................... H04H 7/06
USPC .................... 318/515, 516, 34, 558
See application file for complete search history.

(56) References Cited

U.S. PATENT DOCUMENTS

| | | | |
|---|---|---|---|
| 5,126,678 A | 6/1992 | Williams | |
| 5,418,675 A | 5/1995 | Bodenheimer et al. | |
| 5,483,408 A | 1/1996 | Matsko et al. | |
| 5,701,070 A | 12/1997 | Schultz | |
| 6,867,569 B2 * | 3/2005 | Taniguchi et al. | 322/28 |
| 7,005,833 B2 * | 2/2006 | Adams | 322/37 |
| 7,569,942 B2 * | 8/2009 | Kamimura | 290/40 C |
| 7,663,849 B2 | 2/2010 | Shah et al. | |
| 2008/0277945 A1 | 11/2008 | Lorenz | |
| 2011/0018504 A1 | 1/2011 | Patterson | |

OTHER PUBLICATIONS

Guide to Power System Selective Coordination 600V and Below, Schneider Electric, 2006.
Alternator Protection, part 1: Understanding Code Requirements, Gary Olson, Cummins Power Generation Inc., 2009.
Alternator Protection, part 2: Alternatives, Gary Olson, Cummins Power Generation Inc., 2009.
Alternator Protection, part 3: Generator Set Disconnect Requirements, Gary Olson, Cummins Power Generation Inc., 2009.

* cited by examiner

*Primary Examiner* — David S Luo
(74) *Attorney, Agent, or Firm* — Finnegan, Henderson, Farabow, Garrett & Dunner LLP

(57) ABSTRACT

A power system that supplies electrical power to at least one load is disclosed. The power system may include an electrical power generator, current sensors configured to provide current signals representative of currents output from the electrical power generator to the load, and voltage sensors configured to provide voltage signals representative of voltages output from the electrical power generator to the load. The power system may also include a controller configured to receive the current signals and the voltage signals, compare the current signals and the voltage signals to a predetermined map, determine whether a short circuit exists inside the electrical power generator based on the comparison, and send a command to turn off the electrical power generator when the short circuit exists inside the electrical power generator.

20 Claims, 8 Drawing Sheets

| Short Circuit | | Voltage | | | | | | | | Current | | | | GFCT |
|---|---|---|---|---|---|---|---|---|---|---|---|---|---|---|
| Location | Type | A-B | B-C | C-A | A-N | B-N | C-N | N-G | A | B | C | N | Current |
| I | A-GND | ↓ | ↕ | → | 0 | ↕ | ↕ | ← | 0 | 0 | 0 | ← | ← |
| I | B-GND | → | → | ↕ | ↕ | 0 | ↕ | ← | 0 | 0 | 0 | ← | ← |
| I | C-GND | ↕ | ← | → | ↕ | ↕ | 0 | ↕ | 0 | 0 | 0 | 0 | 0 |
| I | A-B | 0 | ← | ← | ← | ← | ↕ | ← | 0 | 0 | 0 | 0 | 0 |
| I | B-C | ← | ↕ | ← | ↕ | ← | ← | ↕ | 0 | 0 | 0 | 0 | 0 |
| I | C-A | ← | → | 0 | ← | ↕ | ← | ↕ | 0 | 0 | 0 | 0 | 0 |
| II | A-GND | → | ↕ | → | 0 | ↕ | ↕ | ← | 0 | 0 | 0 | ← | ↑s |
| II | B-GND | → | → | ↕ | ↕ | 0 | ↕ | ← | 0 | 0 | 0 | ← | ↑s |
| II | C-GND | ↕ | → | → | ↕ | ↕ | 0 | ← | 0 | 0 | 0 | 0 | ↑s |
| II | A-B | 0 | ← | ← | ← | ← | ↕ | ↕ | ← | 0 | 0 | 0 | 0 |
| II | B-C | ← | 0 | ← | ↕ | ← | ← | ↕ | 0 | ← | 0 | 0 | 0 |
| II | C-A | ← | ← | 0 | ← | ↕ | ← | ↕ | 0 | 0 | ← | 0 | 0 |
| III | A-GND | → | ↕ | → | 0 | ↕ | ↕ | ↕ | 0 | 0 | 0 | ← | ↑s |
| III | B-GND | ↕ | → | ↕ | ↕ | 0 | ↕ | ↕ | 0 | 0 | 0 | ← | ↑s |
| III | C-GND | → | → | → | ↕ | ↕ | 0 | ↕ | 0 | 0 | 0 | 0 | ↑s |
| III | A-B | 0 | ← | ← | ← | ← | ↕ | ↕ | ← | 0 | 0 | 0 | 0 |
| III | B-C | ← | 0 | ← | ↕ | ← | ← | ↕ | 0 | ← | ← | 0 | 0 |
| III | C-A | ← | ← | 0 | ← | ↕ | ← | ↕ | ← | 0 | ← | 0 | 0 |

↑: increase
↑s: slightly increase
↓: decrease
←→: constant
0: zero value

FIG. 5

POWER SYSTEM HAVING SHORT CIRCUIT PROTECTION CONTROLLER

TECHNICAL FIELD

The present disclosure relates generally to a power system, and more particularly, to a power system having a short circuit protection controller.

BACKGROUND

A power system is a network of components used to supply, transmit and/or use electric power. Generally, the power system includes generator sets (gensets), that are self-contained power modules that can be permanently or temporarily connected to an offboard facility, such as a home, a hospital, or a factory, to provide primary, supplemental, and emergency backup power to one or more external loads.

In some situations, an overcurrent condition may occur within the power system. The overcurrent condition may occur due to an overload of the power system, or due to a short circuit within the generator of the power system (an internal short circuit) or a short circuit somewhere outside of the generator of the power system (an external short circuit) of the power system. Certain regulating codes require over current and short circuit protection for power systems both inside and outside of the power system. In addition, the regulating codes require the power system under an overcurrent condition to be able to supply current long enough to allow an overcurrent protection device (e.g., a circuit breaker) closest to the location where an external short circuit exists to trip. This is called selective coordination and is important for providing power to life critical facilities such as hospitals. Selective coordination may require the power system to continue to supply current for several minutes. However, continuing to supply current to a load when the power system has an internal short circuit may greatly increase the risk of fire within the power system, thus increasing the risk of damaging components of the power system other than the ones initially involved in the short circuit. In certain circumstances, there is a risk that the fire may start in as little at $1/10$th of a second after the internal short circuit occurs.

U.S. Pat. No. 7,521,822 (the '822 patent) to Lorenz, published on Nov. 13, 2008, discloses a method for protecting gensets from overcurrent. Specifically, the '822 patent discloses a protection technique for a back-up electric power generation system having generator control circuitry. The technique includes receiving sensor signals representative of electric output of an electric power generator, and determining if a shut-down condition exists, as a function of a protection profile pre-determined for the system.

But, the system of the '822 patent may not differentiate internal short circuits from external short circuits. The system of the '822 patent merely keeps current from exceeding an arbitrary time versus current curve chosen to limit insulation aging from excessive heat generation. The system of the '822 patent may not react fast enough to internal short circuits to inhibit damage to the system. In addition, since the system of the '822 patent relies on current measurement outside of the generator, the system may not be able to identify short circuits in the generator itself.

The disclosed power system having a short circuit protection controller is directed to overcoming one or more of the problems set forth above and/or other problems of the prior art.

SUMMARY

In one aspect, the present disclosure is directed to a power system that supplies electrical power to at least one load. The power system may include an electrical power generator, current sensors configured to provide current signals representative of currents output from the electrical power generator to the load, and voltage sensors configured to provide voltage signals representative of voltages output from the electrical power generator to the load. The power system may also include a controller configured to receive the current signals and the voltage signals, compare the current signals and the voltage signals to a predetermined map, determine whether a short circuit exists inside the electrical power generator based on the comparison, and send a command to turn off the electrical power generator when the short circuit exists inside the electrical power generator.

In another aspect, the present disclosure is directed to a system for controlling an electrical power generator that supplies electrical power to at least one load. The system may include one or more memories including instructions, and one or more processors configured to execute the instructions to receive current signals and voltage signals representative of currents and voltages output from the electrical power generator, compare the current and voltage signals to a predetermined map, determine whether a short circuit exists inside the electrical power generator based on the comparison, and send a command to turn off the electrical power generator when the short circuit exists inside the electrical power generator.

In still another aspect, the present disclosure is directed to a computer-implemented method of controlling an electrical power generator that supplies electrical power to at least one load. The method may include receiving current signals and voltage signals representative of currents and voltages output from the electrical power generator, comparing the currents and the voltages to a predetermined map, determining whether a short circuit exists inside the electrical power generator based on the comparison, and sending a command to turn off the electrical power generator when the short circuit exists inside the electrical power generator.

BRIEF DESCRIPTION OF THE DRAWINGS

FIG. 5 illustrates an exemplary fault table according to an embodiment.

DETAILED DESCRIPTION

Figure 1:
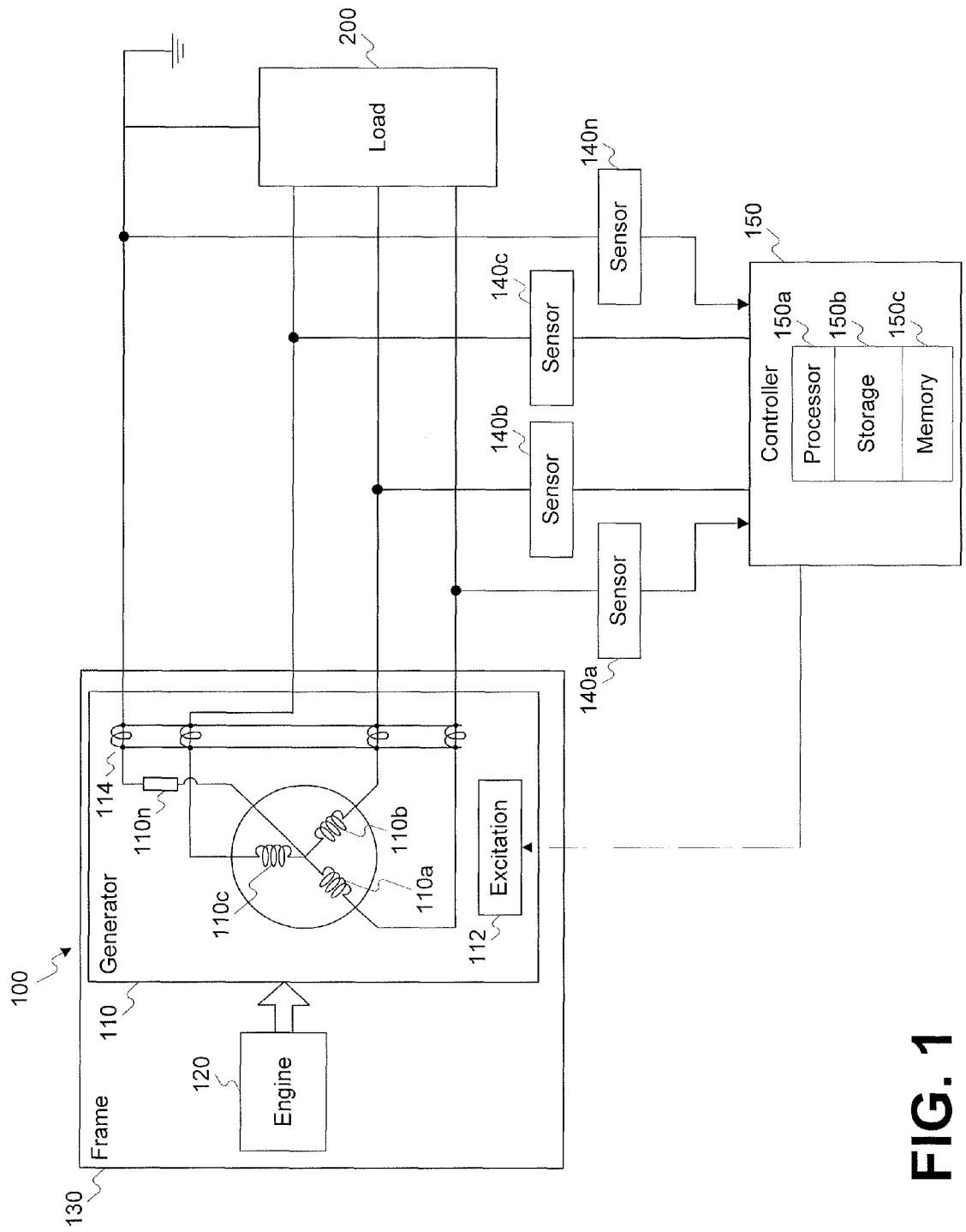
FIG. 1 is a diagrammatic illustration of an exemplary disclosed power system.

FIG. 1 illustrates an exemplary power system 100 providing electrical power to a load 200 consistent with certain disclosed embodiments. Power system 100 may include an electrical power generator 110, an engine 120, a frame 130, a plurality of sensors 140a, 140b, 140c, and 140n, and a controller 150.

Electrical power generator 110 may generate alternating current (AC) power at different phases. In FIG. 1, electrical power generator 110 is shown as a three-phase AC generator that includes three phase windings 110a, 110b, and 110c to generate power at three phases A, B, C. However, the disclosed embodiments are not limited to this configuration, and electrical power generator 110 may be a two-phase generator, a four-phase generator, or any other multiphase generator. Electrical power generator 110 may also include a generator neutral connector 110n connected to a neutral point (not shown). Electrical power generator 110 may be, for example, an AC induction generator, a permanent-magnet generator, an AC synchronous generator, or a switched-reluctance generator. Electrical power generator 110 may further include a generator field excitation unit 112 that regulates excitation of phase windings 110a, 110b, and 110c of electrical power generator 110. Electrical power generator 110 may also include a ground fault current transformer (GFCT) 114 for monitoring the current flowing through all of the leads inside electrical power generator 110, i.e., phase windings 110a, 110b, and 110c, and generator neutral connector 110n, to ground.

Engine 120 may drive electrical power generator 110 to generate the electrical power. Engine 120 may be, for example, a combustion engine that combusts a mixture of fuel and air to produce the rotating mechanical output. One skilled in the art will recognize that engine 120 may be any type of combustion engine such as a diesel engine, a gasoline engine, or a gaseous fuel-powered engine.

Frame 130 may connect engine 120 to electrical power generator 110. At least one of engine 120 and electrical power generator 110 may be mounted to frame 130.

Sensors 140a, 140b, and 140c may sense voltages and currents output by electrical power generator 110 on phases A, B, C, respectively. Each one of sensors 140a, 140b, and 140c may include a voltage sensor and a current sensor. In addition, sensor 140n may be constructed to sense a neutral current flowing through generator neutral connector 110n. Sensors 140a, 140b, 140c and 140n may also transmit current and voltage signals representative of the sensed voltages and currents, respectively, to controller 150.

Controller 150 may be configured to receive the current and voltage signals transmitted from sensors 140a, 140b, 140c and 140n, compare the current signals and the voltage signals to a predetermined map, and determine whether a short circuit exists inside electrical power generator 110 based on the comparison. When the short circuit exists inside electrical power generator 110, controller 150 may be configured to send a command to turn off electrical power generator 110.

Controller 150 may include processor 150a, storage 150b, and memory 150c that are included together in a single device and/or provided separately. Processor 150a may include one or more known processing devices, such as a microprocessor from the Pentium™ or Xeon™ family manufactured by Intel™, the Turion™ family manufactured by AMD™, or any other type of processor that is capable of controlling operations of electrical power generator 110 and engine 120 in response to various input. Memory 150c may include one or more storage devices configured to store information used by controller 150 to perform certain functions related to the disclosed embodiments. Storage 150b may include a volatile or non-volatile, magnetic, semiconductor, tape, optical, removable, nonremovable, or other type of storage device or computer-readable medium. Storage 150b may store programs and/or other information, such as information related to processing data received from one or more sensors, such as a voltage sensor, a current sensor, and a temperature sensor, as discussed in greater detail below. Storage 150b may include one or more data structures, such as, for example, one or more maps, which may include multi-dimensional arrays or lookup tables. The maps may contain data in the form of equations, tables, or graphs. Various other circuits may be associated with controller 150, including power supply circuitry, signal-conditioning circuitry, actuator driver circuitry (i.e., circuitry powering solenoids, motors, or piezo actuators), communication circuitry, and other appropriate circuitry.

Figure 2A:
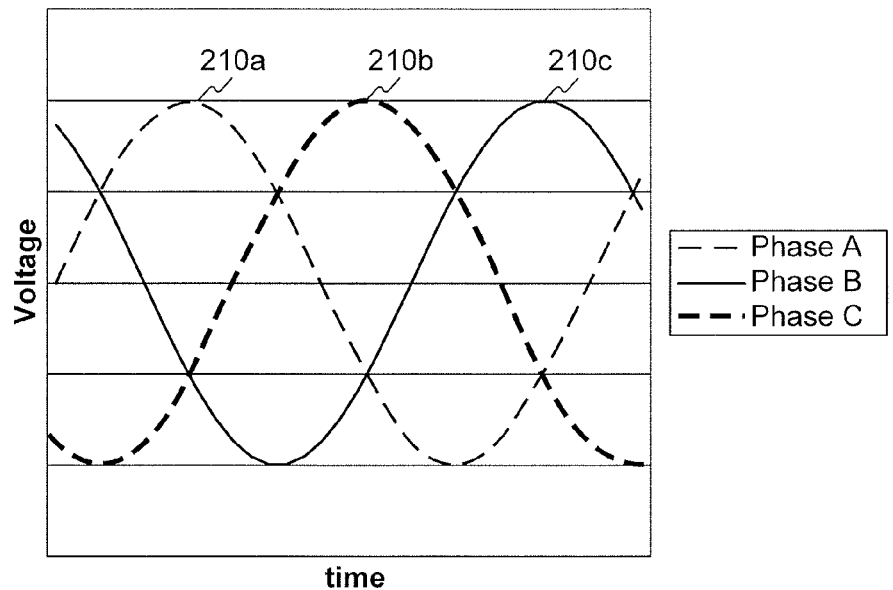
FIG. 2A is a graph illustrating voltage waveforms for three phases A, B, and C when an electrical power generator is under normal condition.
Figure 2B:
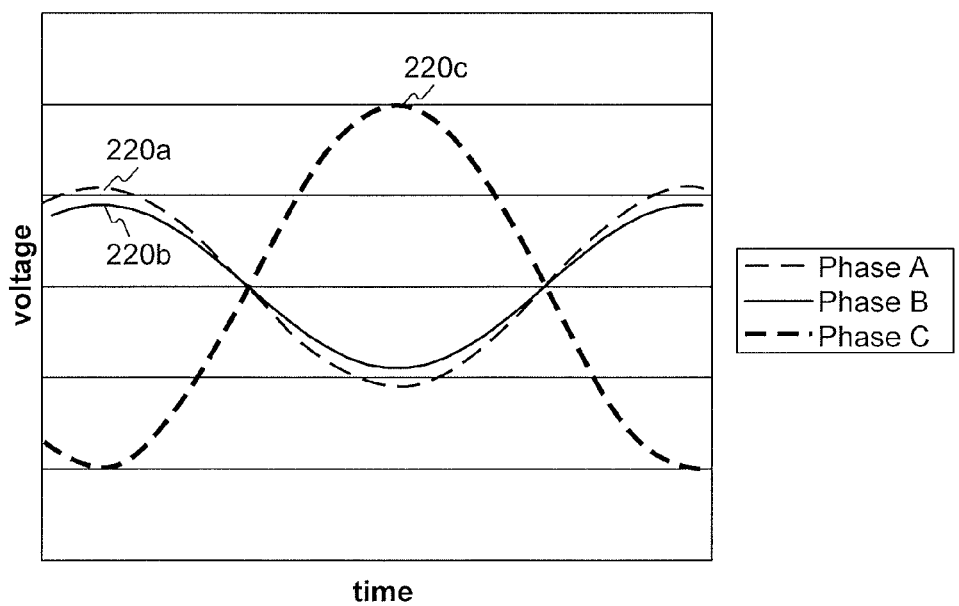
FIG. 2B is a graph illustrating voltage waveforms for three phases A, B, and C, when an electrical power generator is experiencing short circuit between two phase windings.

FIG. 2A is a graph illustrating voltage waveforms 210a, 210b, and 210c of voltages on the three phases A, B, and C, when electrical power generator 110 is operating under normal condition, i.e., no short circuit exists inside or outside of electrical power generator 110. FIG. 2B is a graph illustrating voltage waveforms 220a, 220b, and 220c of voltages on the three phases A, B, and C, when electrical power generator 110 is experiencing a short circuit between phase A and phase B, that is, between phase winding 110a and phase winding 110b. As can be seen from comparing FIG. 2A to FIG. 2B, when a short circuit does not exist (FIG. 2A), the phase shifts among voltage waveforms 210a, 210b, and 210c are evenly distributed. On the other hand, when a short circuit exists between phase A and phase B (FIG. 2A) there is no phase shift (or a negligible phase shift) between waveforms 220a and 220b, and the magnitudes of waveforms 220a and 220b decrease.

In one embodiment, the predetermined map may be a baseline table that includes current and voltage values representative of electrical power generator 110 operating under normal condition, i.e., there is no short circuit inside or outside of electrical power generator 110. Currents and voltages output from electrical power generator 110 may be measured and compared to the baseline table to determine whether there is a short circuit inside electrical power generator 110. The current and voltage values included in the baseline table may be predetermined based on experimental results of operating electrical power generator 110, or a similar generator, when it is known that there are no short circuits, for example. The baseline table may include a time series of current values for each of the three phases A, B, and C, a time series of neutral current values, and a time series voltage values for each of the three phases A, B, and C. For example, the time series of voltage values on each of the three phases A, B, and C may be determined according waveforms 210a, 210b, and 210c of the voltages on each of the three phases A, B, and C as shown in FIG. 2A.

Figure 3:
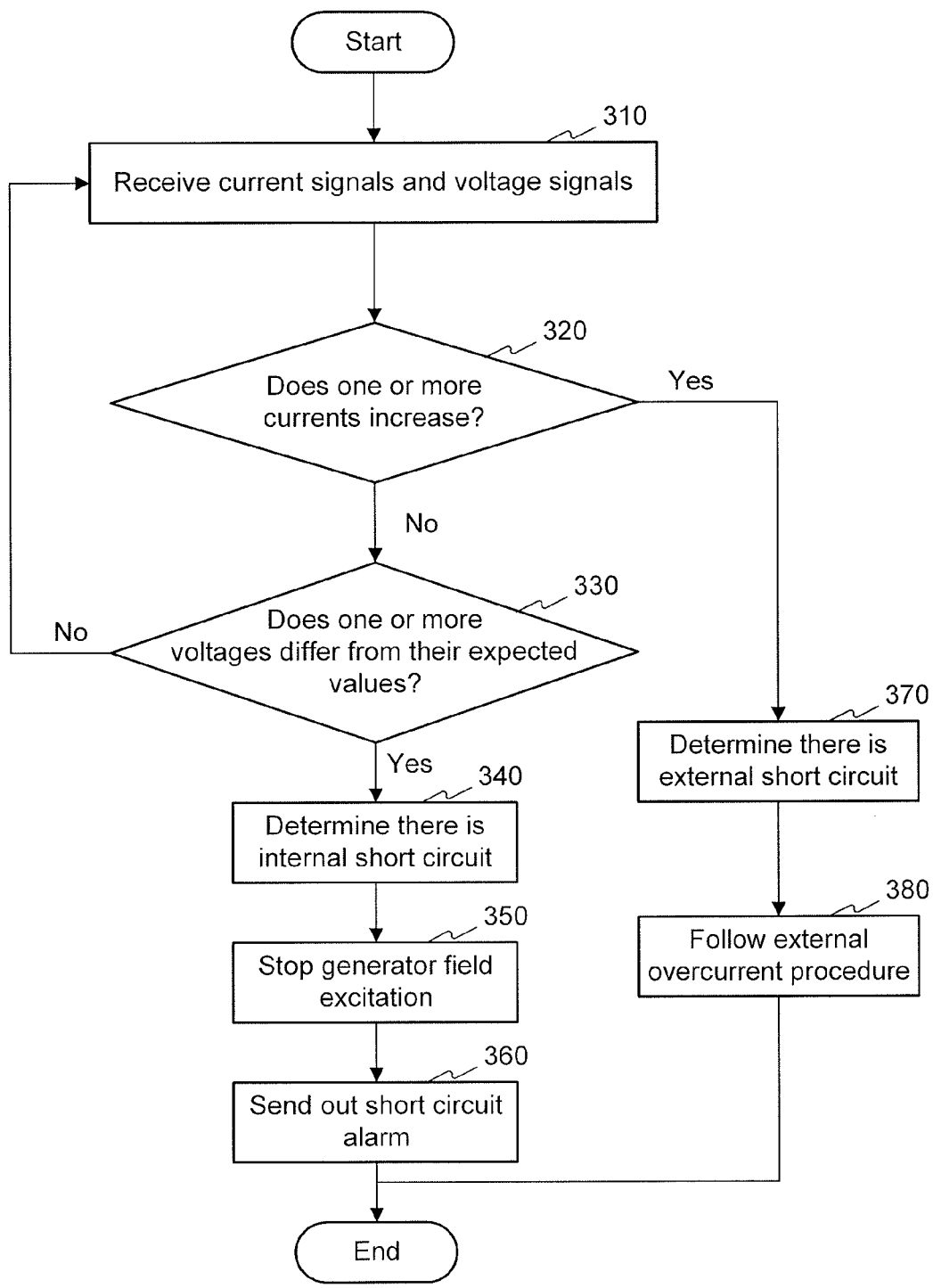
FIG. 3 is a flowchart illustrating an exemplary method of short circuit protection according to an embodiment.

FIG. 3 illustrates an exemplary short circuit detection method that may be performed according to one embodiment. The method may be implemented by processor 150a of controller 150, for example, by executing instructions stored in storage 150b, memory 150c, or elsewhere. First, controller 150 may receive current signals and voltage signals (step 310). The current signals may be representative of currents output from electrical power generator 110 on each of the three phases A, B, and C and a neutral current flowing through generator neutral conductor 110n at a certain time point. The voltage signals may be representative of voltages output from electrical power generator 110 on each of the three phases A, B, and C and voltage output from electrical power generator 110 to generator neutral conductor 110n at the time point. Controller 150 may compare the currents to corresponding current values at the same time point in the baseline table, and determine whether one or more of the currents significantly increase relative to the corresponding current values in the baseline table (step 320). For example, controller 150 may determine whether a difference between one or more of the currents and the corresponding current values in the baseline table exceeds a first threshold, which may be determined based on the characteristics of the entire power system 100. When none of the currents significantly increases relative to the corresponding current values in the baseline table (step 320, No), controller 150 may compare the voltages to corresponding voltage values in the same time period in the baseline table, and determine whether one or more of the voltages significantly differ from their expected values (step 330). For example, controller 150 may determine whether one or more of the voltages significantly differ from the corresponding voltage values in the baseline table. Controller 150 may determine whether a difference between a voltage and the corresponding voltage value in the baseline table exceeds a second threshold, which may be determined based on the characteristics of the entire power system 100. In certain embodiments, when a voltage exceeds 1.73 (or approximately the square root of 3) times the corresponding voltage value in the baseline table, controller 150 may determine that the voltage significantly differs from its expected value. When one or more of the voltages significantly differ from the corresponding voltage values (step 330, Yes), controller 150 may determine that an internal short circuit exists, i.e., a short circuit exists inside electrical power generator 110 (step 340). In such case, controller 150 may send out a command to stop generator field excitation unit 112 of electrical power generator 110 (step 350). Controller 150 may also send out a short circuit alarm signal (step 360). When none of the voltages is significantly different from where it should be (step 330, No), the process goes back to step 310 where the current signals and the voltages signals are received. When one of the currents significantly increases relative to the corresponding current values in the baseline table (step 320, Yes), controller 150 may determine that an external short circuit exists, i.e., a short circuit exists outside of electrical power generator 110 (step 370). In such case, controller 150 may implement an external overcurrent procedure in accordance with the selective coordination requirement specified in the regulation code (step 380). In certain embodiments, controller 150 may complete one iteration of the steps described above every 1/10th of a second or less.

Figure 4A:
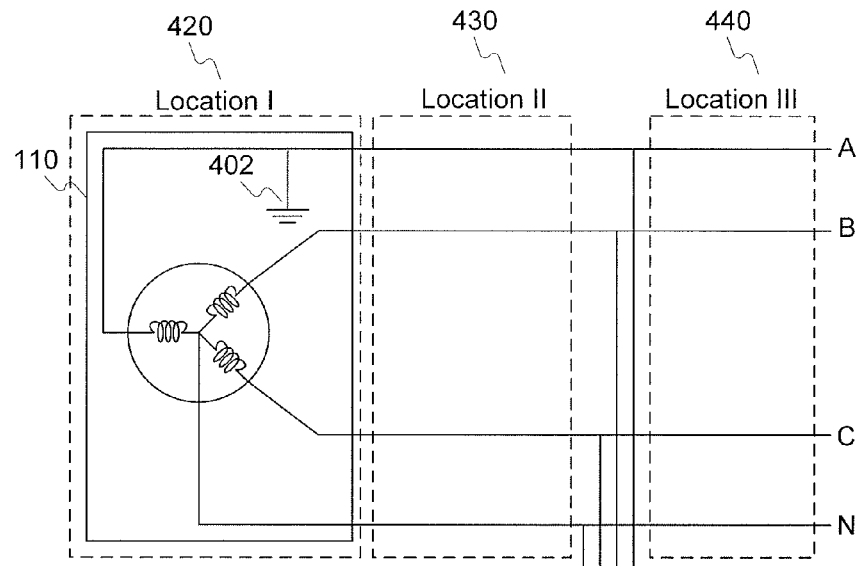
FIGS. 4A-4F illustrates various fault conditions of an electrical power generator.
Figure 4B:
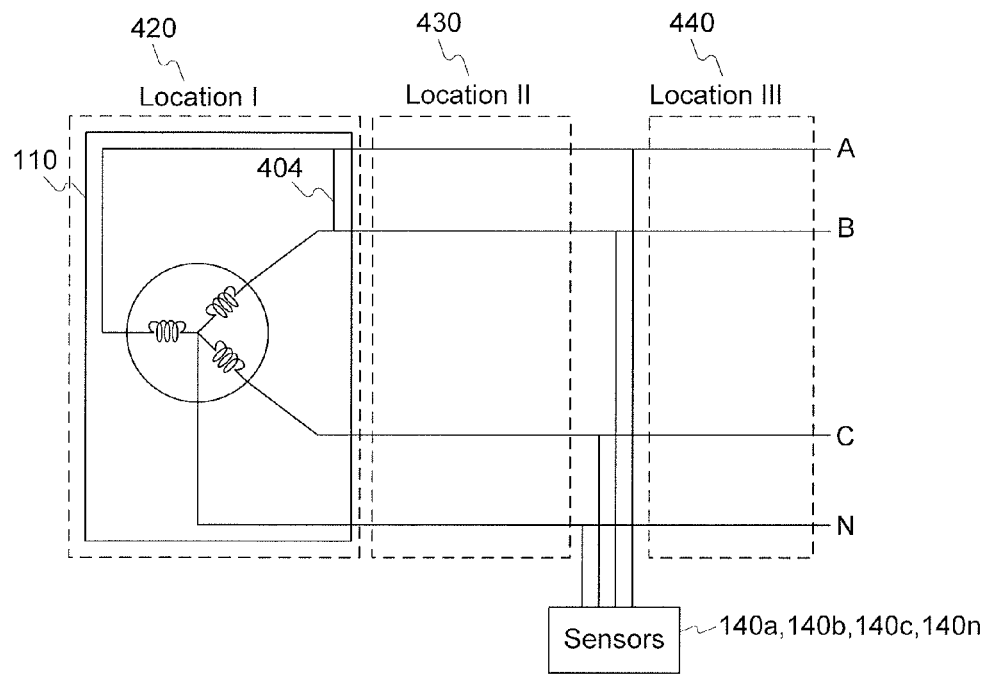

In other embodiments, the predetermined map may be a fault table that includes current and voltage trend indicators predetermined when electrical power generator 110 is operating under various fault conditions as illustrated in FIGS. 4A-4F. FIG. 4A illustrates one of the fault conditions when a short circuit 402 between phase A and ground exists at location I 420, that is, inside electrical power generator 110. FIG. 4B illustrates another fault condition when a short circuit 404 exists at location I 420 inside electrical power generator 110 and between phase A and phase B. Although not illustrated in the figures, the short circuit at location I 420 may be a short circuit between phase B and ground, or between phase C and ground, or between phase B and phase C, or between phase C and phase A.

Figure 4C:
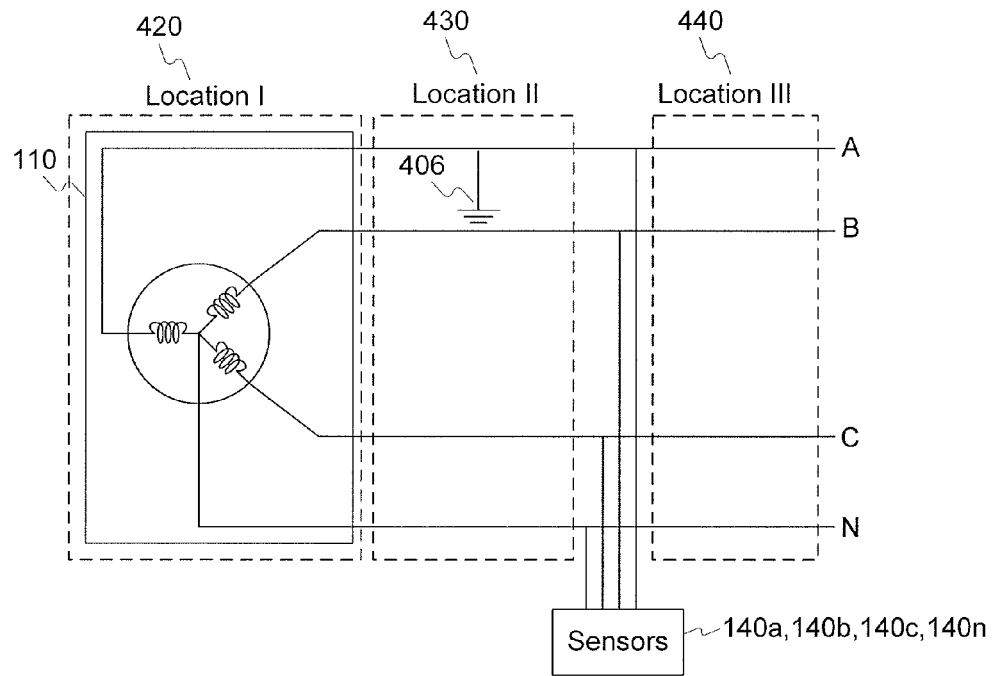
Figure 4D:
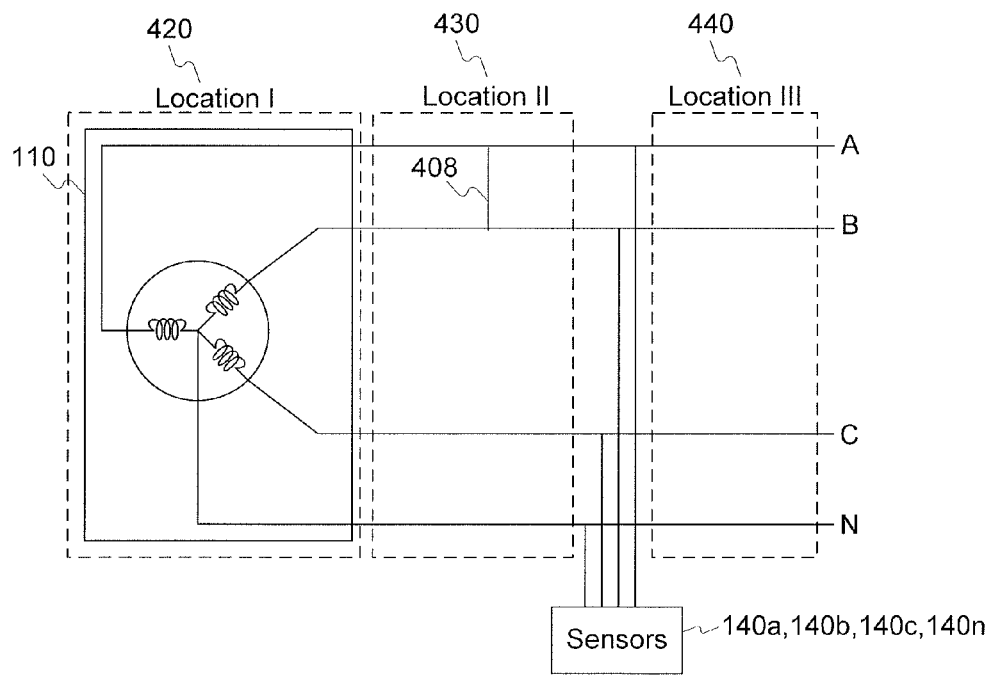

FIGS. 4C and 4D illustrate fault conditions when short circuits exist at location II 430, that is, outside of electrical power generator 110 and in a location upstream of sensors 140a, 140b, 140c and 140n. In FIG. 4C, short circuit 406 is between phase A and ground. In FIG. 4D, short circuit 408 is between phase A and phase B. Similarly, the short circuit at location II 430 may be a short circuit between phase B and ground, or between phase C and ground, or between phase B and phase C, or between phase C and phase A.

Figure 4E:
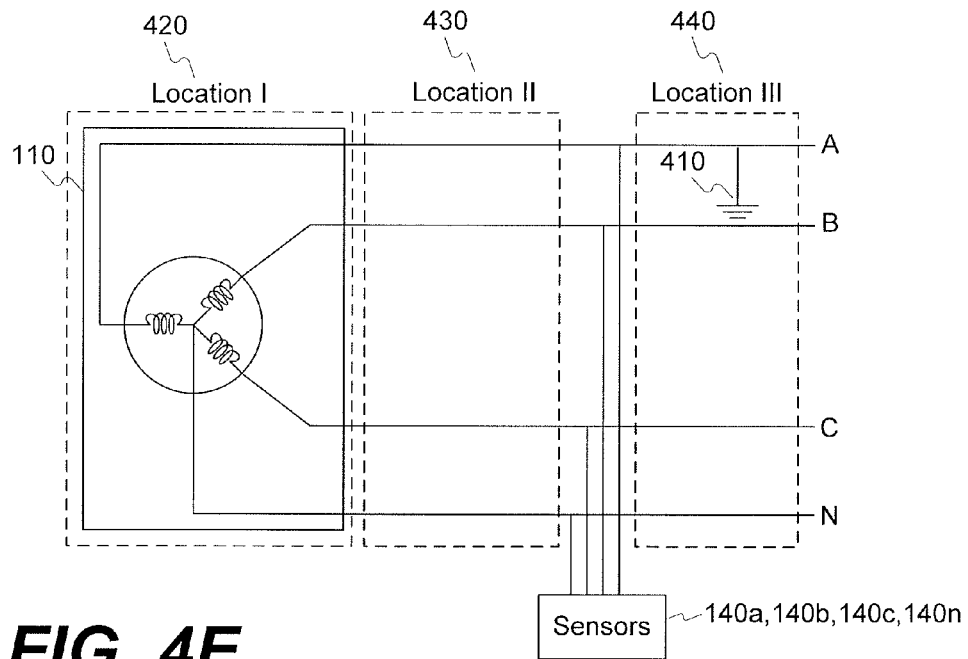
Figure 4F:
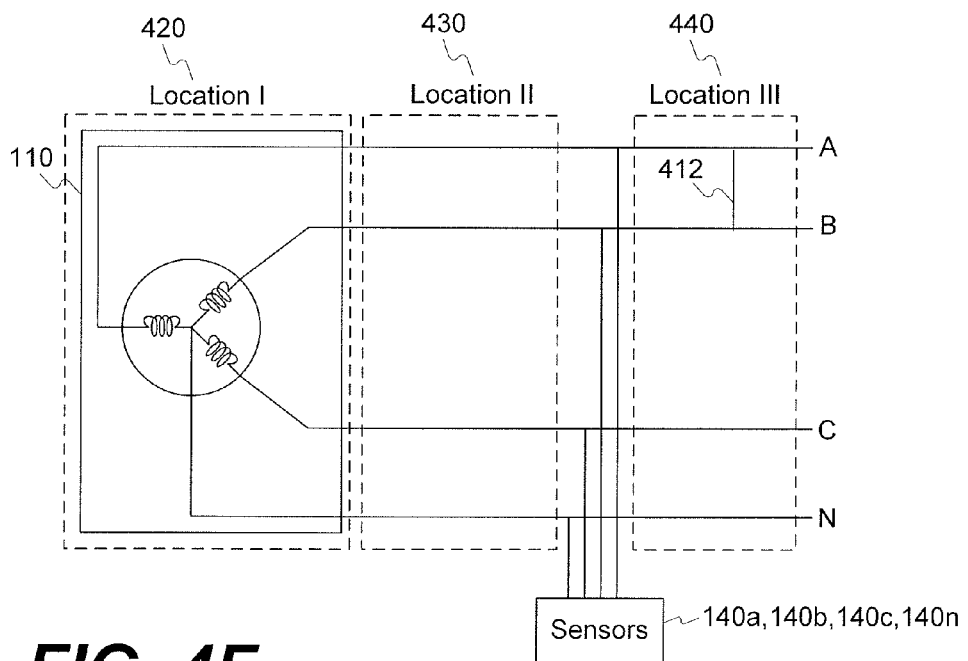

FIGS. 4E and 4F illustrate fault conditions when short circuits exists at location III 440, that is, outside of electrical power generator 110 and in a location downstream of sensors 140a, 140b, 140c and 140n. In FIG. 4E, short circuit 410 exists between phase A and ground. In FIG. 4F, short circuit 412 exists between phase A and phase B. Similarly, the short circuit at location III 440 may be a short circuit between phase B and ground, or between phase C and ground, or between phase B and phase C, or between phase C and phase A.

FIG. 5 illustrates an exemplary fault table 500 that may be used in certain embodiments. Fault table 500 includes current and voltage trend indicators predetermined when electrical power generator 110 is operating under various fault conditions and when there is no load. There are four different types of trend indicators in fault table 500. An upwards arrow "↑" indicates that a current or a voltage increases in a certain degree from its expected value. For example, when a measured voltage or current value exceeds 1.73 (or approximately the square root of 3) times its expected value, the voltage increases and the trend indicator of the voltage is "↑". An indicator "↑s" indicates that a current or a voltage slightly increases from its expected value. For example, when a measured voltage is more than its expected value, but less than 1.73 times its expected value, the trend indicator of that particular voltage is "↑s". A downwards arrow "↓" indicates that a current or a voltage decreases in a certain degree from its expected value. Again, in one example, the trend indicator may be the downward arrow "↓" when a measured voltage or current value is 1.73 (or approximately the square root of 3) time less than its expected value. A left right arrow "↔" indicates that the current or a voltage remain constant in a certain degree. For example, when a difference between a current and its expected value is less than a threshold (e.g., 1.73), the current is constant and the trend indicator of the current is "↔". A number "0" indicates that a current or a voltage is zero. Although there are only five types of trend indicators in fault table 500 of FIG. 5, additional indicators may be included. For example, a trend indicator "↑↑" may be used to indicate that a measured value greatly increases (e.g., more than 5 times its expected value).

Fault table 500 may include a plurality of rows each representing a unique fault condition. For example, the first row of table represents a condition in which a short circuit between phase A and ground exists at location I, which is illustrated in FIG. 4A. Each row of fault table 500 may include trend indicators of voltage differences between phase A and phase B, between phase B and phase C, between phase C and phase A, between phase A and generator neutral conductor 110n, between phase B and generator neutral conductor 110n, between phase C and generator neutral conductor 110n, and between generator neutral conductor 110 to ground, and of currents flowing on phase A, phase B, phase C, and through generator neutral conductor 110n, as well as a ground fault current. In this example, fault table 500 illustrated in FIG. 5 is determined when there is no load. Alternatively, a load may be connected between a pair of phases A, B, and C, or between one of phases A, B, and C, and ground. Different fault tables may be composed based on different locations of the load.

In this embodiment, currents and voltages output from electrical power generator 110 may be measured and compared to their expected values to determine their respective trends, and the determined trends of the currents and voltages are compared to the corresponding trend indicators in each of the rows in fault table 500 to determine whether there is a matching row, and when there is matching row, to determine the type and location of a short circuit based on a location of the matching row. In one embodiment, a row is determined to be a matching row when all of the determined trends within that row are the same as their corresponding trend indicators in a row of fault table 500. In addition, in this disclosure, the values of the voltages and currents are root mean square (RMS) values over a certain period, e.g., a generator cycle.

Short circuits cause two changes in the electrical power produced by electrical power generator 110. First, a voltage between shorted components will drop to near zero as required by Kirchhoff's voltage law. When a short circuit exists inside electrical power generator 110 and between one of phases A, B, and C and ground, the voltage difference between that phase and generator neutral conductor 110n will be nearly zero. For example, according to FIG. 5, in the first row of fault table 500 (short circuit exists at location I and between phase A and ground), the voltage A-N is zero. Similarly, when a short circuit exists inside electrical power generator 110 and between two of phases A, B, and C, the voltage difference between the two phases will be zero. For example, according to FIG. 5, in the fourth row of fault table 500 (short circuit exists at location I and between phase A and phase B), the voltage A-B is zero. On the other hand, when the short circuit exists outside of electrical power generator 110 and between two of phases A, B, and C, the voltage difference between the phase voltages will also drop as described, but the amount of the voltage difference that stays above zero will be higher due to the resistance in the remaining circuit of electrical power generator 110 that excludes the components that are shorted. Second, current measured along the electrical path that includes the components (phase windings 110a, 110b, 110c, or neutral connector 110n) that experiencing short circuit will increase as required by Kirchhoff's current law. However, Ohms law requires that the amount of current passing though other circuits that connect the same elements will have to decrease.

The trend indicators within fault table 500 illustrated in FIG. 5 are determined based on experimental analysis in one embodiment of the present disclosure. However, the present disclosure is not limited to those precise trend indicators or arrangement of trend indicators in fault table 500. Various other changes and modifications may be made to fault table 500 for different embodiments without departing from the scope or spirit of the present disclosure.

Figure 6:
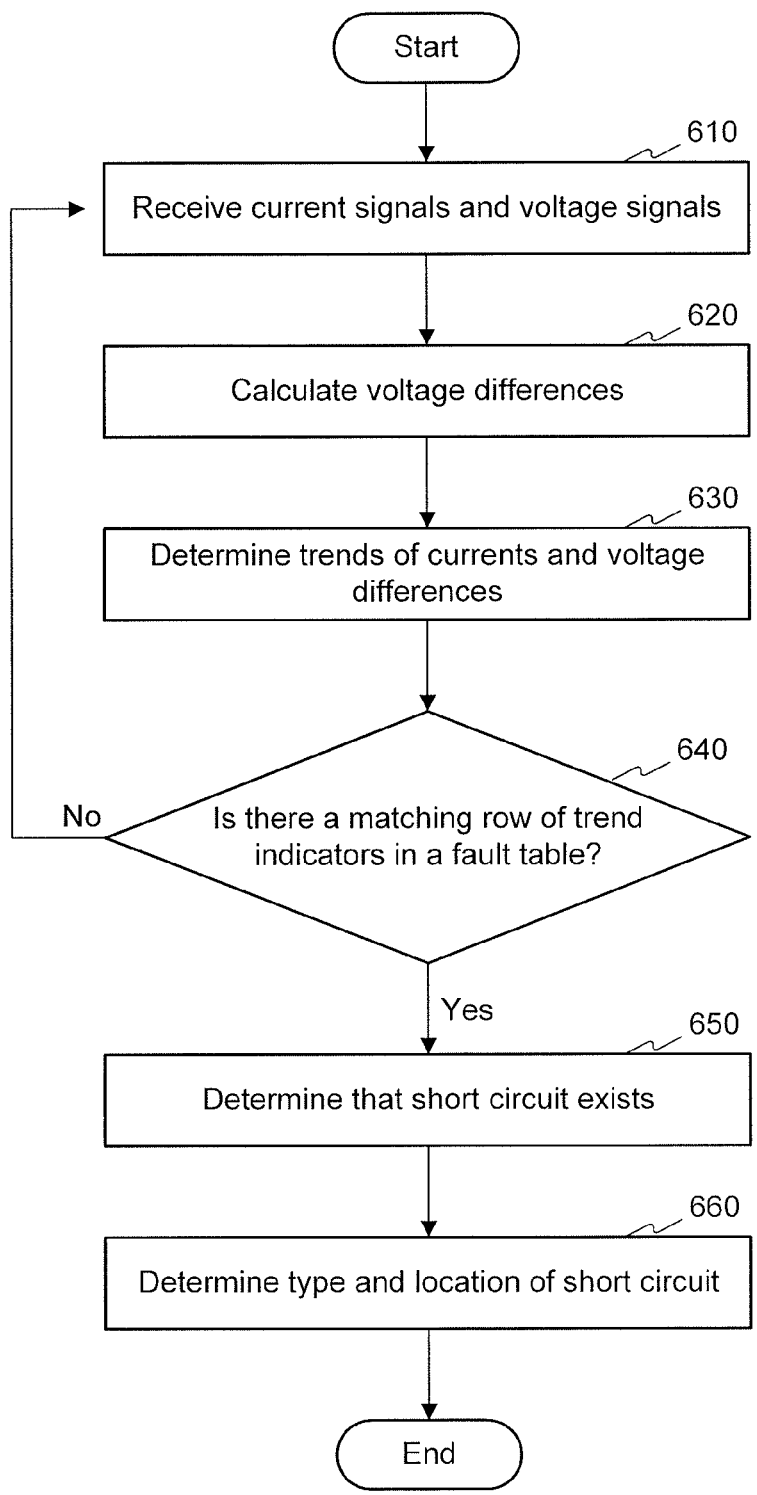
FIG. 6 is a flowchart illustrating an exemplary method of short circuit protection according to another embodiment.

FIG. 6 illustrates an exemplary short circuit protection method that may be implemented by processor 150a of controller 150, according to certain embodiments. First, controller 150 may receive current signals and voltage signals (step 610). The current signals and the voltage signals may be received from sensors 140a, 140b, 140c, 140n, and ground fault current transformer (GFCT) 114. The current signals may be representative of RMS currents output from electrical power generator 110 on each of the three phases A, B, and C and a neutral current flowing through generator neutral conductor 110n over a generator cycle. The voltage signals may be representative of RMS voltages output from electrical power generator 110 on each of the three phases A, B, and C and voltage output from electrical power generator 110 to generator neutral conductor 110n over a generator cycle.

Controller 150 may calculate voltage differences between each pair of the three phases A, B, and C and between each of the three phases A, B, and C and generator neutral conductor 110n based on the voltage signals (step 620). Controller 150 may compare the currents and the voltage differences to their respective expected values to determine their respective trends (step 630). For example, the currents and the voltage differences may be compared to a baseline table that includes the expected values of the currents and the voltage differences.

Controller 150 may compare the trends of the currents and the voltage differences to their corresponding trend indicators in each row of fault table 500, and determine whether there is a matching row of trend indicators in fault table 500 (step 640). Controller 150 may determine that there is a matching row, i.e., that the measured current and voltage trends match a row in fault table 500, if all of the measured trends are the same as their corresponding trend indicators in that particular row of fault table 500. On the other hand, controller 150 may determine that there is not a matching row, i.e., that the measured and current voltage trends to not match a row in fault table 500, if one or more of the measured trends are different than their corresponding trend indicators in the rows of fault table 500.

When there is a matching row (step 640, Yes), controller 150 may determine that there is a short circuit (step 650). In addition, based on a location of the matching row within fault table 500, controller 150 may determine a type and a location of the short circuit within power system 100 (step 660). For example, when the matching row is the fourth ($4^{th}$) row of fault table 500, controller 150 may determine that the short circuit exists inside electrical power generator 110 and between phase A and phase B. On the other hand, when the matching row is the eleventh ($11^{th}$) row of fault table 500, controller 150 may determine that the short circuit exists outside of electrical power generator 110, upstream of sensors 140a, 140b, 140c and 140n, and between phase B and phase C. In this way, controller 150 may determine the short circuit type (between one of the three phases A, B, and C and ground or between a pair of the three phases A, B, and C), and the short circuit location (inside electrical power generator 110, or outside of electrical power generator 110 and upstream of sensors 140a, 140b, 140c and 140n, or outside of electrical power generator 110 and downstream of sensors 140a, 140b, 140c and 140n).

When the short circuit exists inside electrical power generator 110, controller 150 may send out a command to stop generator field excitation unit 112 of electrical power generator 110, and may send out a short circuit alarm signal. When the short circuit exists outside of electrical power generator 110, controller 150 may implement an external overcurrent procedure in accordance with the selective coordination requirement described in the regulation code. When there is no matching row in fault table 500 (step 640, No), the process returns to step 610 where current signals and the voltages signals are received.

In some embodiments, when the currents and the voltage differences match the corresponding current and voltage difference values in more than one of the plurality of table entries of the fault table, controller 150 may use Bayesian inference and probability distribution based on previous measurement results to determine which one of the various fault conditions has the highest probability.

In one embodiment, an outside synchronization signal may be used to determine the direction of the current measured by sensors 140a, 140b, 140c, and 140n. For example, controller 150 may receive the outside synchronization signal, and use the outside synchronization signal to determine whether the currents on the three phases A, B, and C and the neutral current are flowing into electrical power generator 110 or flowing out of electrical power generator 110.

INDUSTRIAL APPLICABILITY

The disclosed power system with the short circuit protection controller may help to reduce damages to an electrical power generator. In particular, the disclosed power system with the short circuit protection controller may quickly determine a location of a short circuit, and may immediately halt the operation of the electrical power generator when the short circuit exists inside the electrical power generator. In this way, effective short circuit protection may be provided while the electrical power generator may still meet the requirement of selective coordination.

It will be apparent to those skilled in the art that various modifications and variations can be made to the disclosed system. Other embodiments will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A power system that supplies electrical power to at least one load, the power system comprising:
   an electrical power generator;
   current sensors configured to provide current signals representative of currents output from the electrical power generator to the load, wherein:
      the electrical power generator provides the electrical power in three phases with a neutral conductor; and
      the current sensors are configured to provide the current signals representative of the currents output from the electrical power generator to the load on each of the three phases and a neutral current flowing through the neutral conductor;
   voltage sensors configured to provide voltage signals representative of voltages output from the electrical power generator to the load; and
   a controller configured to:
      receive the current signals and the voltage signals;
      compare the current signals and the voltage signals to a predetermined map;
      determine whether a short circuit exists inside the electrical power generator based on the comparison; and
      send a command to turn off the electrical power generator when the short circuit exists inside the electrical power generator.

2. The power system of claim 1, wherein:
   the voltage sensors are configured to provide the voltage signals representative of the voltages output from the electrical power generator to the load on each of the three phases and to the neutral conductor.

3. The power system of claim 2, wherein the controller is configured to calculate voltage differences between each pair of the three phases, between each of the three phases and the neutral conductor, and between the neutral conductor to ground, based on the voltage signals.

4. The power system of claim 3, wherein the controller is configured to compare the currents and voltage differences to their respective expected values to determine their respective trends.

5. The power system of claim 4, wherein each of the trends is one selected from a group of increasing, slightly increasing, decreasing, constant, and zero.

6. The power system of claim 4, wherein the predetermined map is a fault table including a plurality of rows, each row representing a fault condition caused by a combination of a short circuit location and a short circuit type, and each row including a plurality of predetermined trend indicators of current and voltage differences corresponding to the fault condition.

7. The power system of claim 6, wherein the plurality of rows include:
   first second, third, fourth, fifth, and sixth rows having the predetermined trend indicators of currents and voltage differences when a short circuit exists inside the electrical power generator and between a first phase of the three phases and ground, between a second phase of the three phases and ground, between a third phase of the three phases and ground, between the first phase and the second phase, between the first phase and the third phase, and between the second phase and the third phase, respectively;
   seventh, eighth, ninth, tenth, eleventh, and twelfth rows having the predetermined trend indicators of currents and voltage differences when a short circuit exists outside of the electrical power generator and upstream of the current and voltage sensors and between the first phase and ground, between the second phase and ground, between the third phase and ground, between the first phase and the second phase, between the first phase and the third phase, and between the second phase and the third phase, respectively; and
   thirteenth, fourteenth, fifteenth, sixteenth, seventeenth, and eighteenth rows having the predetermined trend indicators of currents and voltage differences when short circuit exists outside of the electrical power generator and downstream of the current and voltage sensors and between the first phase and ground, between the second phase and ground, between the third phase and ground, between the first phase and the second phase, between the first phase and the third phase, and between the second phase and the third phase, respectively.

8. The power system of claim 6, wherein the controller is further configured to:
   compare the trends of the currents and voltage differences to their corresponding trend indicators in each row of the fault table and determine whether there is a matching row in the fault table; and
   when there is a matching row, determine that a short circuit exists, and determine a location and a type of the short circuit based on a location of the matching row in the fault table.

9. The power system of claim 6, wherein the trend indicators of the current and voltage values in the predetermined map are determined based on properties and a location of the at least one load.

10. The power system of claim 1, wherein the controller is configured to receive the current and voltage signals and make the comparison in a period of 0.1 second or less.

11. A system for controlling an electrical power generator that supplies electrical power to at least one load, the system comprising:
   one or more memories including instructions; and
   one or more processors configured to execute the instructions to:
      receive current signals and voltage signals representative of currents and voltages output from the electrical power generator, wherein:
         the electrical power generator provides the electrical power in three phases with a neutral conductor; and
         current sensors are configured to provide the current signals representative of the currents output from the electrical power generator to the load on each of the three phases and a neutral current flowing through the neutral conductor;
      compare the current and voltage signals to a predetermined map;
      determine whether a short circuit exists inside the electrical power generator based on the comparison; and
      send a command to turn off the electrical power generator when the short circuit exists inside the electrical power generator.

12. A computer-implemented method of controlling an electrical power generator that supplies electrical power to at least one load, the method comprising:
   receiving current signals and voltage signals representative of currents and voltages output from the electrical power generator, wherein:
      the electrical power is supplied in three phases with a neutral conductor, and
      the current signals represent the currents output from the electrical power generator to the load on each of the three phases and a neutral electrical current through the neutral conductor;
   comparing the currents and the voltages to a predetermined map;
   determining whether a short circuit exists inside the electrical power generator, based on the comparison; and
   sending a command to turn off the electrical power generator when the short circuit exists inside the electrical power generator.

13. The method of claim 12, wherein
   the voltage signals represent the voltage differences between each pair of the three phases, between each of the three phases and the neutral conductor, and between the neutral conductor to ground.

14. The method of claim 13, wherein the predetermined map is a fault table including a plurality of rows, each row representing a fault condition caused by a combination of a short circuit location and a short circuit type, and each row including a plurality of predetermined trend indicators of currents and voltage differences corresponding to the fault condition.

15. The method of claim 14, wherein the plurality of rows include:
   first, second, third, fourth, fifth, and sixth rows having the predetermined trend indicators of currents and voltage differences when a short circuit exists inside the electrical power generator and between a first phase of the three phases and ground, between a second phase of the three phases and ground, between a third phase of the three phases and ground, between the first phase and the second phase, between the first phase and the third phase, and between the second phase and the third phase, respectively;
   seventh, eighth, ninth, tenth, eleventh, and twelfth rows having the predetermined trend indicators of currents and voltage differences when a short circuit exists outside of the electrical power generator and upstream of current and voltage sensors and between the first phase and ground, between the second phase and ground, between the third phase and ground, between the first phase and the second phase, between the first phase and the third phase, and between the second phase and the third phase, respectively; and
   thirteenth, fourteenth, fifteenth sixteenth, seventeenth, and eighteenth rows having the predetermined trend indicators of currents and voltage differences when short circuit exists outside of the electrical power generator and downstream of the current and voltage sensors and between the first phase and ground, between the second phase and ground, between the third phase and ground, between the first phase and the second phase, between the first phase and the third phase, and between the second phase and the third phase, respectively.

16. The method of claim 14, further including comparing the currents and voltage differences to their respective expected values to determine their respective trends.

17. The method of claim 16, wherein each of the trends is one selected from a group of increasing, slightly increasing, decreasing, constant, and zero.

18. The method of claim 16, further including:
   comparing the trends of the currents and voltage differences to their corresponding trend indicators in each row of the fault table;
   determining whether there is a matching row in the fault table; and
   when there is a matching row, determining that a short circuit exists, and determining a location and a type of the short circuit based on a location of the matching row in the fault table.

19. The method of claim 16, wherein the trend indicators of the current and voltage values in the predetermined map are determined based on properties and a location of the at least one load.

20. The method of claim 12, wherein the comparing the currents and the voltages to a predetermined map, and the determining whether a short circuit exists inside the electrical power generator, based on the comparison, are performed in a period of 0.1 second or less.

* * * * *